United States Patent
Lee et al.

(10) Patent No.: US 12,434,408 B2
(45) Date of Patent: Oct. 7, 2025

(54) NUCLEAR STRUCTURE DRY CUTTING APPARATUS

(71) Applicant: EGUN CO., LTD., Gwangju-si (KR)

(72) Inventors: Sung Jun Lee, Gwangju-si (KR); Chae Mun Lee, Seongnam-si (KR)

(73) Assignee: EGUN CO., LTD., Guangju-si (KR)

( * ) Notice: Subject to any disclaimer, the term of this patent is extended or adjusted under 35 U.S.C. 154(b) by 257 days.

(21) Appl. No.: 18/275,546

(22) PCT Filed: Jan. 22, 2022

(86) PCT No.: PCT/KR2022/001177
§ 371 (c)(1),
(2) Date: Aug. 2, 2023

(87) PCT Pub. No.: WO2022/169147
PCT Pub. Date: Aug. 11, 2022

(65) Prior Publication Data
US 2024/0091987 A1 Mar. 21, 2024

(30) Foreign Application Priority Data
Feb. 3, 2021 (KR) .................. 10-2021-0015153

(51) Int. Cl.
*B28D 7/02* (2006.01)
*B28D 1/08* (2006.01)
*G21D 1/00* (2006.01)

(52) U.S. Cl.
CPC ................ *B28D 7/02* (2013.01); *B28D 1/08* (2013.01); *G21D 1/003* (2013.01)

(58) Field of Classification Search
CPC ............. B28D 7/02; B28D 1/08; G21D 1/003
See application file for complete search history.

(56) References Cited

U.S. PATENT DOCUMENTS

| | | | | |
|---|---|---|---|---|
| 3,131,947 | A * | 5/1964 | McCarty | B25D 17/005 279/19 |
| 6,013,079 | A * | 1/2000 | Salam | B23D 59/04 606/176 |
| 2015/0034531 | A1 * | 2/2015 | Starke | G21F 9/30 209/3.1 |
| 2018/0326590 | A1 * | 11/2018 | Masuda | B25J 15/04 |
| 2022/0241918 | A1 * | 8/2022 | Karlsson | B23D 45/16 |
| 2022/0355430 | A1 * | 11/2022 | Eckel | B23Q 11/0071 |
| 2022/0410434 | A1 * | 12/2022 | Lee | B28D 5/045 |
| 2025/0114974 | A1 * | 4/2025 | Lee | B23D 57/0069 |

FOREIGN PATENT DOCUMENTS

| | | |
|---|---|---|
| CN | 209953923 | 1/2020 |
| JP | 1994042118 | 2/1994 |
| JP | 2013020025 | 1/2013 |
| JP | 2017114666 | 8/2017 |

* cited by examiner

*Primary Examiner* — Sean M Michalski
(74) *Attorney, Agent, or Firm* — Fish IP Law, LLP (57) ABSTRACT

A wire saw apparatus comprises: a first pulley system from which a wire is withdrawn toward a structure to be cut; a second pulley system into which the wire is introduced from the structure; a first dust collection pipe unit provided to surround the wire between an end part at which surrounding of the structure by the wire ends and a part at which the wire is introduced into the first pulley system; and a second dust collection pipe unit provided to surround the wire between a start part at which surrounding of the structure by the wire starts and a part at which the wire is withdrawn from the second pulley system.

15 Claims, 8 Drawing Sheets

NUCLEAR STRUCTURE DRY CUTTING APPARATUS

TECHNICAL FIELD

The present invention relates to a dry cutting apparatus for a nuclear structure, and more particularly, to a wire saw apparatus capable of cutting a dangerous structure using a dry cutting method and collecting foreign substances generated by the dry cutting method.

BACKGROUND ART

In general, a structure made of concrete may be cut using a cutting device using a diamond wire. A cutting wire configured to cut a concrete structure or rock is easily contaminated by various foreign substances, such as dust, water, or sludge, during a cutting process. When dismantling a structure, it is necessary not only to collect foreign substances and dust generated from the concrete structure but also to remove foreign substances present on the surface of the cutting wire and foreign substances falling into the diamond wire saw. A conventional dust-collecting device for a wire saw is focused on collecting dust and foreign substances generated from a structure by sealing a cut area of the structure. However, as described above, when a structure to be dismantled is a structure containing a dangerous material, such as a concrete structure of a nuclear power plant, it is not sufficient to seal a cut area of the structure to collect dust. When dismantling a structure containing materials dangerous to the human body or the like (a dangerous structure), there are many risk factors, such as dispersion of foreign substances into the atmosphere, falling of foreign substances out of a wire saw, or falling of foreign substances attached to the surface of a cutting wire. However, a conventional dust-collecting device/method for a wire saw apparatus has a limitation in collecting dust when dismantling a dangerous structure.

DISCLOSURE

Technical Problem

A technical task of the present invention is to provide a wire saw apparatus using a dry cutting method.

The technical tasks to be accomplished by the present invention are not limited to the above-mentioned technical task, and other technical tasks not mentioned herein will be clearly understood by those skilled in the art from the following description.

Technical Solution

In order to accomplish the above technical task, a wire saw apparatus according to an embodiment of the present invention, which is configured to collect foreign substances generated during a dry cutting process, includes a first pulley system configured to feed a wire to a structure to be cut, a second pulley system configured to receive the wire from the structure, a first dust-collecting pipe unit configured to surround the wire between a point of the wire that is separated from the structure after surrounding the structure and a point of the wire that enters the first pulley system, and a second dust-collecting pipe unit configured to surround the wire between a point of the wire that reaches the structure to surround the structure and a point of the wire that escapes from the second pulley system. At least one of the first dust-collecting pipe unit or the second dust-collecting pipe unit includes a first pipe and a second pipe having different diameters from each other, and the first pipe and the second pipe are connected to each other so as to be movable in a horizontal direction in a state in which at least a portion of the first pipe is inserted into the second pipe.

In the wire saw apparatus, each of the first pipe and the second pipe may include an inlet formed in one side thereof to allow the wire to pass therethrough. Each of the first pipe and the second pipe may include an injection port formed in the outer circumferential surface thereof to allow air to be injected thereinto. In the wire saw apparatus, each of the first pipe and the second pipe may have a coupling structure dividable into an upper part and a lower part. Each of the first pipe and the second pipe may include a rubber packing inserted into the inlet formed therein. In the wire saw apparatus, the rubber packing may be formed to be dividable into an upper part and a lower part, and the upper part and the lower part may form a diameter larger than the diameter of the wire when coupled to each other. The wire saw apparatus may further include dust-collecting ports mounted near the first pulley system and the second pulley system, a first dust collector configured to collect foreign substances in a manner of suctioning air through a connection pipe connected to each of the dust-collecting ports, and a motor for cleaning connected to the first dust collector via the connection pipe to supply suction force enabling the first dust collector to suction the air. The wire saw apparatus may further include at least one main roller configured to rotate to feed the wire, at least one driving roller disposed below the at least one main roller to feed the wire to the second pulley system, dust-collecting ports mounted near the at least one main roller and the at least one driving roller, and a second dust collector configured to collect foreign substances in a manner of suctioning air through a connection pipe connected to each of the dust-collecting ports. The motor for cleaning may be connected to the second dust collector via the connection pipe to supply air suction force to the second dust collector. In the wire saw apparatus, at least one of the first pulley system or the second pulley system may include a rubber member containing stone powder and a silicon component and attached to the outer circumferential surface of a roller provided therein. The wire saw apparatus may further include a protective frame configured to protect an interior of the wire saw apparatus, a first transparent sealing cover mounted between the protective frame and a cutting system including the first and second pulley systems, and a second transparent sealing cover mounted to each of door frames provided in the protective frame. In the wire saw apparatus, the upper part and the lower part of the first pipe are coupled to each other using a flat head bolt, and the upper part and the lower part of the second pipe are coupled to each other using a bolt and a nut. In the wire saw apparatus, each of the first dust-collecting pipe unit and the second dust-collecting pipe unit is connected to the protective frame via a connection part, the first pipe is coupled at an inlet thereof to the connection part using a fixing band, and the connection part and a fixing plate mounted on the protective frame are packed and coupled to each other using a rubber plate.

In order to accomplish the above technical task, a wire saw apparatus according to another embodiment of the present invention, which is configured to collect foreign substances generated during a dry cutting process, includes a first pulley system configured to pass a wire introduced thereinto from one end of a cover provided so as to seal a cut portion of a structure to be cut, at least one main roller configured to allow the wire that has passed through the first pulley system to rotate along the outer circumferential surface thereof using power, and at least one driving roller configured to feed the wire introduced thereinto from the at least one main roller to a second pulley system. The second pulley system passes the wire introduced thereinto from the at least one driving roller to feed the wire to an opposite end of the cover, and a member containing stone powder and a silicon component is attached to the outer circumferential surface of at least one roller among the at least one main roller, the at least one driving roller, at least one roller provided in the first pulley system, and at least one roller provided in the second pulley system.

In the wire saw apparatus, the member containing stone powder and a silicon component is a rubber member. The wire saw apparatus includes a first dust-collecting pipe unit configured to surround the wire between the one end of the cover and a point of the wire that enters the first pulley system and a second dust-collecting pipe unit configured to surround the wire between the opposite end of the cover and a point of the wire that escapes from the second pulley system. At least one of the first dust-collecting pipe unit or the second dust-collecting pipe unit includes a first pipe and a second pipe having different diameters from each other, and the first pipe and the second pipe are connected to each other so as to be movable in a horizontal direction in a state in which at least a portion of the first pipe is inserted into the second pipe. In the wire saw apparatus, each of the first pipe and the second pipe may include an inlet formed in one side thereof to allow the wire to pass therethrough. Each of the first pipe and the second pipe may include an injection port formed in the outer circumferential surface thereof to allow air to be injected thereinto. The foreign substances may include a radioactive material, and the structure may include a nuclear structure.

Advantageous Effects

The present invention described above has the following various effects.

The wire saw apparatus 100 according to the present invention is very advantageous in dismantling dangerous structures, such as nuclear power plants or nuclear structures. Because a wet cutting method is not suitable for dangerous structures, a dry cutting method is used.

The wire saw apparatus 100 prevents foreign substances containing dangerous materials separated from a wire 10 traveling therethrough from being dispersed into the atmosphere or to the outside using dust-collecting pipe units 200 and 300, thereby greatly improving safety during dismantling work. In addition, the wire saw apparatus 100 prevents separation of the wire 10 using the dust-collecting pipe units 200 and 300, thereby ensuring worker safety. In addition, the wire saw apparatus 100 cools the wire 10 heated during cutting work using cool air supplied thereto through the dust-collecting pipe units 200 and 300, thereby prolonging the lifespan of the wire 10.

The wire saw apparatus 100 according to the present invention prevents foreign substances containing dangerous materials from being dispersed into the atmosphere or to the outside of the wire saw apparatus 100 using a double-sealing cover structure mounted therein. In addition, the wire saw apparatus 100 according to the present invention may efficiently collect foreign substances, such as dust or dirt, containing dangerous materials using a plurality of dust-collecting ports and a dust collector mounted in the wire saw apparatus 100.

In the wire saw apparatus 100 according to the present invention, since rubber members containing special materials are attached to the outer circumferential surfaces of rollers instead of conventional urethane members, the rollers may be highly resistant to heat generated from the wire 10 and thus may have improved durability, and consequently, efficiency of cutting work may be improved.

The effects achievable through the invention are not limited to the above-mentioned effects, and other effects not mentioned herein will be clearly understood by those skilled in the art from the following description.

BEST MODE

Hereinafter, preferred embodiments of the present invention will be described in detail with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

In some cases, in order to prevent the technical concept of the present invention from being unclear, structures or devices that are publicly known may be omitted, or may be depicted in the form of a block diagram centering on the core functions of the structures or the devices. In the description of the present invention, when describing positional relationships, for example, when the positional relationship between two parts is described using "on", "above", "below", "next to", or the like, one or more other parts may be located between the two parts unless the term "directly" or "closely" is used. Hereinafter, preferred embodiments of the present invention will be described in detail with reference to the accompanying drawings so that those skilled in the art to which the present invention pertains may easily carry out the present invention. Respective features of the various embodiments of the present invention may be partially or wholly united or combined with each other, and various interlocking and driving are technically possible as those skilled in the art can fully understand. The respective embodiments may be implemented independently of each other, or may be implemented together in an interrelated manner.

A cutting method used by a wire saw apparatus, which is one of mechanical saws or sawing machines, includes a wet cutting method and a dry cutting method. The present invention relates to a diamond wire saw apparatus using a dry cutting method. Therefore, hereinafter, the wire saw apparatus using the dry cutting method will be abbreviated as a "wire saw apparatus" for convenience and simplicity of description. The wire saw apparatus may remove foreign substances, for example, dust or dirt, present on the surface of a cutting wire 10. The wire 10 used for the wire saw apparatus may be a cutting wire capable of cutting a hard structure. The wire 10 may be a long flexible string capable of cutting a hard structure such as concrete or rock. For example, the wire 10 may be a diamond cutting wire, but the invention is not limited thereto. A wire saw apparatus using a diamond cutting wire may be referred to as a diamond wire saw apparatus. As an example of the present invention, the wire saw apparatus will be described as performing cutting operation using a diamond cutting wire, but the cutting wire is not limited to the diamond cutting wire. Hereinafter, for convenience of description, the cutting wire will be abbreviated as a wire.

Figure 1:
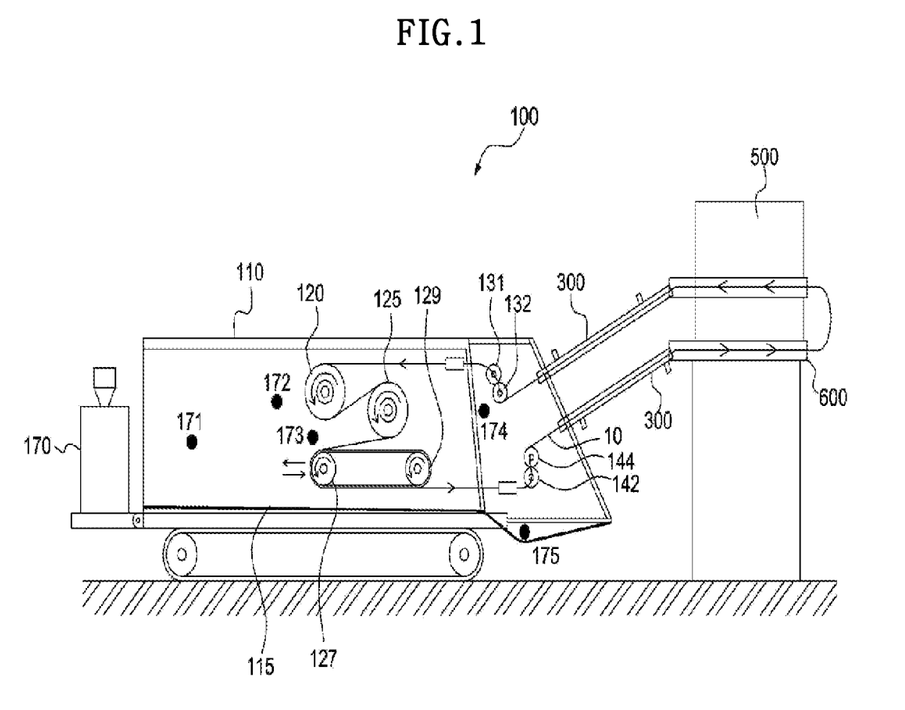
FIG. 1 is a view showing the configuration of a wire saw apparatus 100 for collecting foreign substances generated when performing cutting using a dry cutting method according to an embodiment of the present invention.

FIG. 1 is a view showing the configuration of a wire saw apparatus 100 for collecting foreign substances generated when performing cutting using a dry cutting method according to an embodiment of the present invention.

Referring to FIG. 1, the wire saw apparatus 100 using a dry cutting method may include a protective frame 110, a lower inclined surface 115, a first main roller 120, a second main roller 125, a first driving roller 127, a second driving roller 129, a first pulley system 130, a second pulley system 140, a dust collector 190, a plurality of dust-collecting ports 171, 172, 173, 174, and 175, a first dust-collecting pipe unit 200, a second dust-collecting pipe unit 300, and a moving wheel for movement of the wire saw apparatus.

In the wire saw apparatus 100 using a dry cutting method according to the present invention, a cutting system and an engine unit are provided in and protected by the protective frame 110. The protective frame 110 of the wire saw apparatus 100 includes a support frame and a transparent window. The support frame is a component defining an outer framework of the protective frame 210. The support frame may include a plurality of openings through which the inner space in the wire saw apparatus 100 is connected to the outside. In addition, the transparent window may be provided in each of the plurality of openings in the support frame in order to block the inner space in the wire saw apparatus 100 from the outside. In particular, the transparent window is provided within each of door frames of the support frame. The transparent window may be made of a transparent material, for example, transparent acrylic or transparent glass, and may form a transparent sealing cover 116. Accordingly, a worker may visually check removal of foreign substances from the wire 10 of the wire saw apparatus 100 through the transparent window.

The protective frame 110 may have an inner space defined therein, and the first main roller 120, the second main roller 125, the first pulley system 130, the second pulley system 140, the dust collector 170, the plurality of dust-collecting ports 171 to 175, and the lower inclined surface 115 may be disposed in the inner space in the protective frame 110. The protective frame 110 may have a closed structure capable of blocking the interior of the wire saw apparatus 100 from the outside.

In addition, the protective frame 110 may have a structure having one open side, and the wire 10 may enter or exit the protective frame through the open side. The remaining portion of the protective frame 110, except for the open side thereof, may have a closed structure that blocks the inner space in the protective frame 110 from the outside, thereby preventing foreign substances, for example, dust or dirt, present in the wire saw apparatus 100 from being discharged to the outside of the wire saw apparatus 100.

The first main roller 120 and the second main roller 125 of the wire saw apparatus 100 may be rollers that are rotated by power. The first main roller 120 and the second main roller 125 may be connected to a motor configured to supply rotational force. The first main roller 120 and the second main roller 125 may be rotated by the motor. The motor may be an internal motor included in the wire saw apparatus 100. Alternatively, the motor may be disposed outside the wire saw apparatus 100 and may be connected to the first main roller 120 and the second main roller 125. The first main roller 120 and the second main roller 125 may be rotated by power supplied from the motor, and the wire 10, which is in contact with the outer circumferential surface of the first main roller 120 and the outer circumferential surface of the second main roller 125, may be moved along the outer circumferential surface of the first main roller 120 and the outer circumferential surface of the second main roller 125 by rotation of the first main roller 120 and the second main roller 125. Although two main rollers are illustrated in FIG. 1, the invention is not limited thereto. The number of main rollers may be one or may be two or more.

The first driving roller 127 and the second driving roller 129 of the wire saw apparatus 100 are rollers that are located below the first main roller 120 and the second main roller 125 to guide the wire 10 traveling thereto via the first main roller 120 and the second main roller 125 to the second pulley system 140.

The first pulley system 130 of the wire saw apparatus 100 is a component capable of removing foreign substances present on the surface of the wire 10. The wire 10 may enter the wire saw 100 through the open side from the outside of the wire saw apparatus 100, and may travel to the first main roller 120 via the first pulley system 130. The first pulley system 130 may remove foreign substances present on the surface of the wire 10 introduced into the wire saw 100.

The first pulley system 130 may include a first upper roller 131 and a first lower roller 132. The second pulley system 140 may include a second upper roller 144 and a second lower roller 142. The first pulley system 130 and the second pulley system 140 may be disposed separate from each other so as not to overlap each other when viewed from above. As such, since the first pulley system 130 and the second pulley system 140 are disposed separate from each other so as not to overlap each other when viewed from above, it may be possible to prevent foreign substances removed by the first pulley system 130 from entering the second pulley system 140. The first pulley system 130 may be located at a higher position than the second pulley system 140. In the present invention, the first upper roller 131, the first lower roller 132, the second upper roller 144, and the second lower roller 142 function to separate foreign substances attached to the surface of the wire so that the foreign substances are collected in the dust-collecting unit located thereunder. Therefore, the first upper roller 131 may be referred to as a first upper dust-collecting roller, the first lower roller 132 may be referred to as a first lower dust-collecting roller, the second upper roller 144 may be referred to as a second upper dust-collecting roller, and the second lower roller 142 may be referred to as a second lower dust-collecting roller.

In the first pulley system 130, the first upper roller 131 and the first lower roller 132 may be disposed obliquely with respect to a direction perpendicular to the ground. The first lower roller 132 may be disposed closer to the open side of the wire saw apparatus 100 than the first upper roller 131. The wire 10 may pass through the first upper roller 131 and the first lower roller 132 in a zigzag pattern. In detail, the wire 10 entering the first pulley system 130 may first travel along the outer circumferential surface of the first lower roller 132, and subsequently may travel along the outer circumferential surface of the first upper roller 131 via a space between the first lower roller 132 and the first upper roller 131. As such, since the wire 10 passes through the first upper roller 131 and the first lower roller 132 in a zigzag pattern, the contact area between the wire 10 and each of the first upper roller 131 and the first lower roller 132 may be increased more effectively.

The wire 10 that has passed through the first pulley system 130 is rotated along the outer circumferential surface of the first main roller 120, and then travels to the outer circumferential surface of the second main roller 125. The wire 10 escaping from the outer circumferential surface of the second main roller 125 enters the second pulley system 140 via the driving rollers 127 and 129 located below the second main roller 125.

While passing through the first upper roller 131 and the first lower roller 132, the wire 10 may receive centrifugal force generated on the outer circumferential surface of each of the first upper roller 131 and the first lower roller 132 due to rotation thereof. Foreign substances, such as dirt or dust, present on the surface of the wire 10 may be separated in a direction tangential to the outer circumferential surface of the first upper roller 131 and in a direction tangential to the outer circumferential surface of the first lower roller 132 by the centrifugal force generated by rotation of the rollers. Then, the separated foreign substances may fall toward the ground due to gravity and may be collected through the dust-collecting ports 174 and 175. This will be described later in detail.

The second pulley system 140 includes a second upper roller 144 and a second lower roller 142. The second lower roller 142 may be disposed below the second upper roller 144. The structure and function of the second pulley system 140 including the second upper roller 144 and the second lower roller 142 are substantially the same as those of the above-described first pulley system 130, and thus a detailed description thereof will be omitted. Foreign substances may be primarily removed from the wire 10 through the first pulley system 130 and secondarily removed from the wire 10 through the second pulley system 140.

Although the wire saw apparatus 100 according to an embodiment of the present invention has been described as including both the first pulley system 130 and the second pulley system 140, the invention is not limited thereto. The wire saw apparatus 100 may include only the first pulley system 130 or may include only the second pulley system 140.

The lower (bottom) inclined surface 115 of the wire saw apparatus 100 may be inclined so that foreign substances removed from the wire 10 through the first main roller 120 are introduced into a predetermined dust-collecting port. The bottom surface of the inner space in the wire saw apparatus 100 may be inclined at, for example, a first angle θ1, due to the bottom inclined surface 115. The bottom inclined surface 115 may be formed such that the height thereof gradually decreases from a portion thereof adjacent to the first main roller 120 to a portion thereof adjacent to the dust-collecting port 175. As such, since the bottom inclined surface 115 is inclined at the first angle θ1 (e.g. θ1 ranges from 10 degrees to 30 degrees with respect to a line perpendicular to the ground, foreign substances, such as dirt, falling to the bottom inclined surface 115 may move downward and may be collected through the dust-collecting port 175.

The structure 500 shown in FIG. 1 may be a dangerous structure that is exposed to radiation or contains dangerous materials, for example, a nuclear power plant building, a nuclear structure, or a nuclear-related structure. In order to cut this structure 500, the wire saw apparatus 100 operates such that the wire 10 surrounds the structure 500. The structure 500 may be sealed by a safety cover, and a dust-collecting device 600 may collect dust in a state of sealing a cut portion of the structure 500.

The wire 10 circulates, for example, in such a manner that the wire 10 passes through the second pulley system 140, travels around the structure 500, and enters the first pulley system 130. In this case, foreign substances generated when the wire 10 cuts the structure 500 may be collected by embedding the dust-collecting device in the structure. However, there is a problem in that foreign substances attached to the wire 10 may fall to the ground while the wire 10 travels from the structure 500 to the first pulley system 130 and while the wire 10 travels from the second pulley system 140 to the structure 500. These foreign substances may be dangerous materials, for example, materials exposed to radiation, and thus it is necessary to completely collect the foreign substances in order to prevent the foreign substances from falling to the ground or being dispersed into the atmosphere.

To this end, the wire saw apparatus 100 may include a first dust-collecting pipe unit 200 and a second dust-collecting pipe unit 300. The first dust-collecting pipe unit 200 and the second dust-collecting pipe unit 300 collect foreign substances, such as dust or dirt, falling from the wire 10. In particular, each of the first dust-collecting pipe unit 200 and the second dust-collecting pipe unit 300 may be provided with air injection ports 211 and 251, through which air (e.g. cool air) is injected into the first dust-collecting pipe unit 200 and the second dust-collecting pipe unit 300 so that foreign substances attached to the wire 10 are separated from the wire 10 and are collected. This will be described in detail with reference to FIG. 2.

Figure 2:
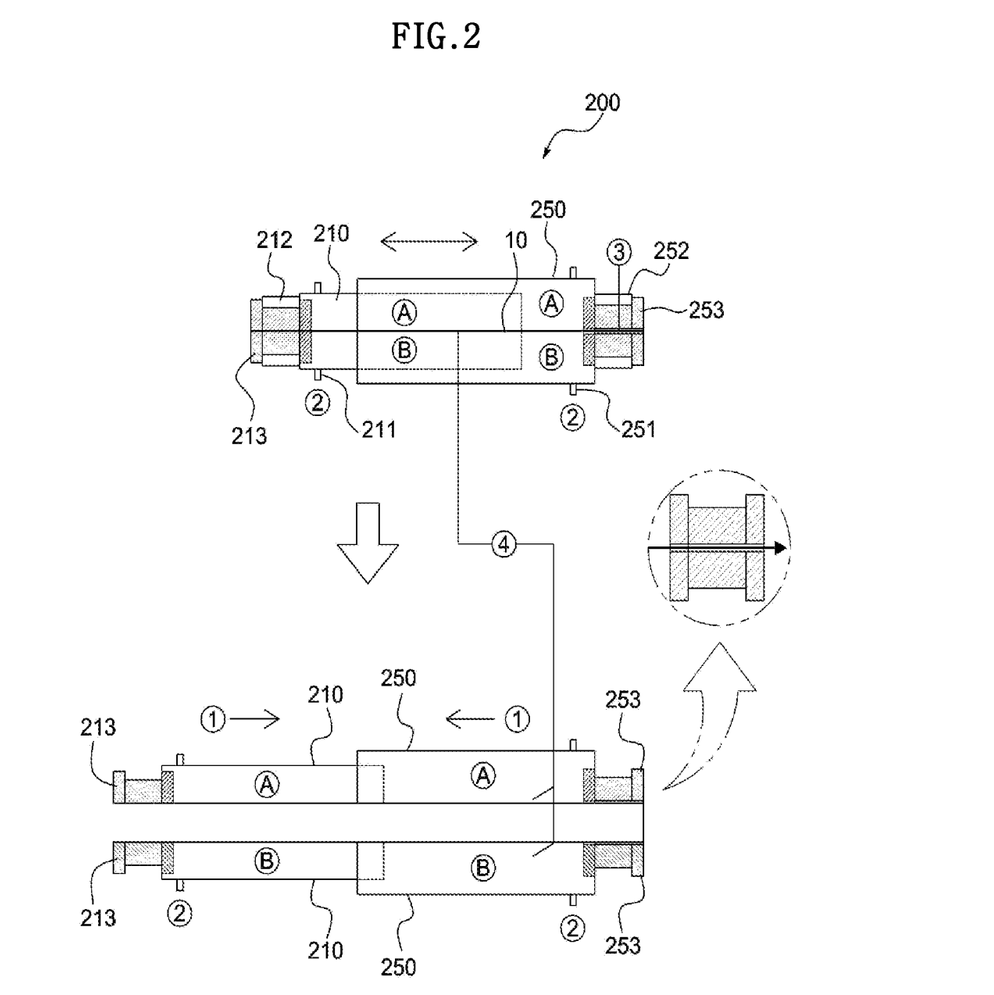
FIG. 2 is a view for explaining the detailed configuration of dust-collecting pipe units 200 and 300 provided in the wire saw apparatus according to the present invention.

FIG. 2 is a view for explaining the detailed configuration of the dust-collecting pipe units 200 and 300 provided in the wire saw apparatus according to the present invention.

As shown in FIG. 1, the first dust-collecting pipe unit 200 and the second dust-collecting pipe unit 300 are disposed at different heights in a vertical direction, and have the same detailed configuration as each other. Therefore, only the detailed configuration of the first dust-collecting pipe unit 200 will be described.

Referring to FIG. 2, the first dust-collecting pipe unit 200 may include a plurality of (e.g. two) pipes 210 and 250. Here, the first pipe 210 has a smaller diameter than the second pipe 250 so as to be inserted into the second pipe 250, and the first dust-collecting pipe unit 200 may be adjusted in length so as to be extended through such an insertion coupling structure. The first pipe 210 and the second pipe 250 may preferably have a rectangular shape. For example, when the first pipe 210 and the second pipe 250 move away from each other in a leftward-rightward direction, the length of the first dust-collecting pipe unit 200 may be increased, and when the first pipe 210 and the second pipe 250 move toward each other, the length of the first dust-collecting pipe unit 200 may be reduced. In this way, the length of the first dust-collecting pipe unit 200 is adjusted.

The first pipe 210 may include an inlet 212 formed in one side thereof, and the second pipe 250 may include an inlet 252 formed in one side thereof, whereby the wire 10 may pass through the pipes. The first pipe 210 and the second pipe 250 include air injection ports 211 and 251, respectively, through which air (e.g. cool air for cooling the wire 10) is injected from the outside.

As indicated by A and B in FIG. 2, each of the first pipe 210 and the second pipe 250 may include an upper part A and a lower part B, which are coupled to each other. That is, each of the first pipe 210 and the second pipe 250 need to be configured such that the upper part A and the lower part B are detachably coupled to each other. The reason for this is that it is difficult to cause the wire 10 to pass through the first dust-collecting pipe unit 200 during cutting work because the wire 10 is very heavy and may have dangerous foreign substances attached thereto and work efficiency is greatly deteriorated. Therefore, the upper part A and the lower part B need to be coupled to each other, with the wire 10 connected to the wire saw apparatus 100 interposed therebetween, thereby forming the first pipe 210 and the second pipe 250, and consequently constituting the first dust-collecting pipe unit 200.

Rubber packings 213 and 253 containing special materials are inserted into the inlets 212 and 252, respectively, in order to prevent the wire 10 from being separated or moving greatly upward and downward. In addition, the rubber packings 213 and 253 need to be provided in the inlets 212 and 252 in order to prevent air introduced through the air injection ports 211 and 251 and sprayed to the wire 10 to remove foreign substances from being discharged to the outside in a large amount. As described above, since each of the first pipe 210 and the second pipe 250 is formed such that the upper part and the lower part thereof are coupled to each other, each of the rubber packings 213 and 253 also needs to include an upper part and a lower part, which are formed to be coupled to each other. In this case, the upper part and the lower part of each of the rubber packings 213 and 253 may be coupled to each other so as to form a certain radius. For example, the wire 10 has a diameter of 10φ, and the upper part and the lower part of each of the rubber packings 213 and 253 may be coupled to each other so as to form a diameter of 15φ, thereby allowing the wire 10 to pass through the rubber packings 213 and 253 without generating large frictional force and preventing air in the first pipe 210 and the second pipe 250 from being discharged to the outside in a large amount. The arrow "→" shown in the middle part of FIG. 2 indicates the wire 10, and the wire 10 passes between the upper part and the lower part of each of the rubber packings 213 and 253, which are coupled to each other.

Figure 3:
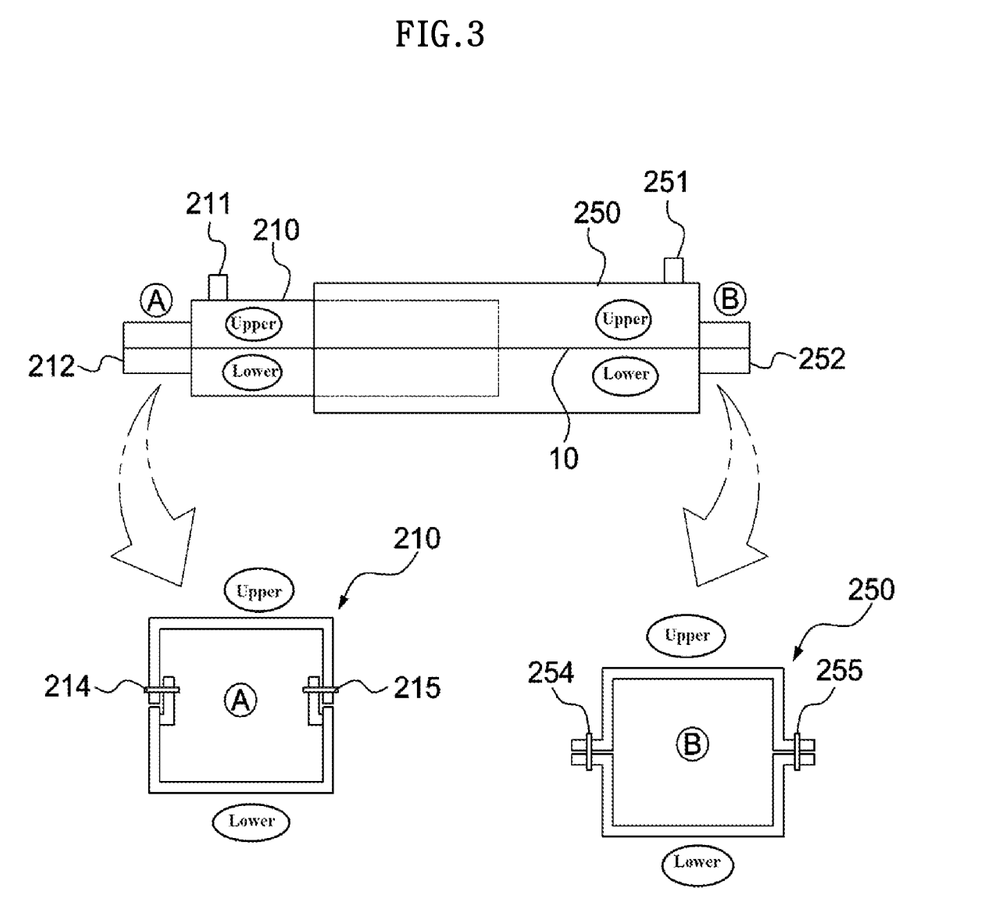
FIG. 3 is a view for explaining the coupling structure of an upper part and a lower part of each of a first pipe 210 and a second pipe 250.

FIG. 3 is a view for explaining the coupling structure of the upper part and the lower part of each of the first pipe 210 and the second pipe 250.

Referring to FIG. 3, the upper part and the lower part of the first pipe 210, which has a relatively small diameter, may be separably coupled to each other to form the first pipe 210. In this case, the upper part and the lower part may include coupling portions 214 and 215 formed so as to be coupled to each other by means of bolts (e.g. flat head bolts).

Similarly, the upper part and the lower part of the second pipe 250, which has a relatively large diameter, may also be separably coupled to each other to form the second pipe 250. In this case, the upper part and the lower part may include coupling portions 254 and 255 formed so as to be coupled to each other by means of bolts and nuts.

Figure 4:
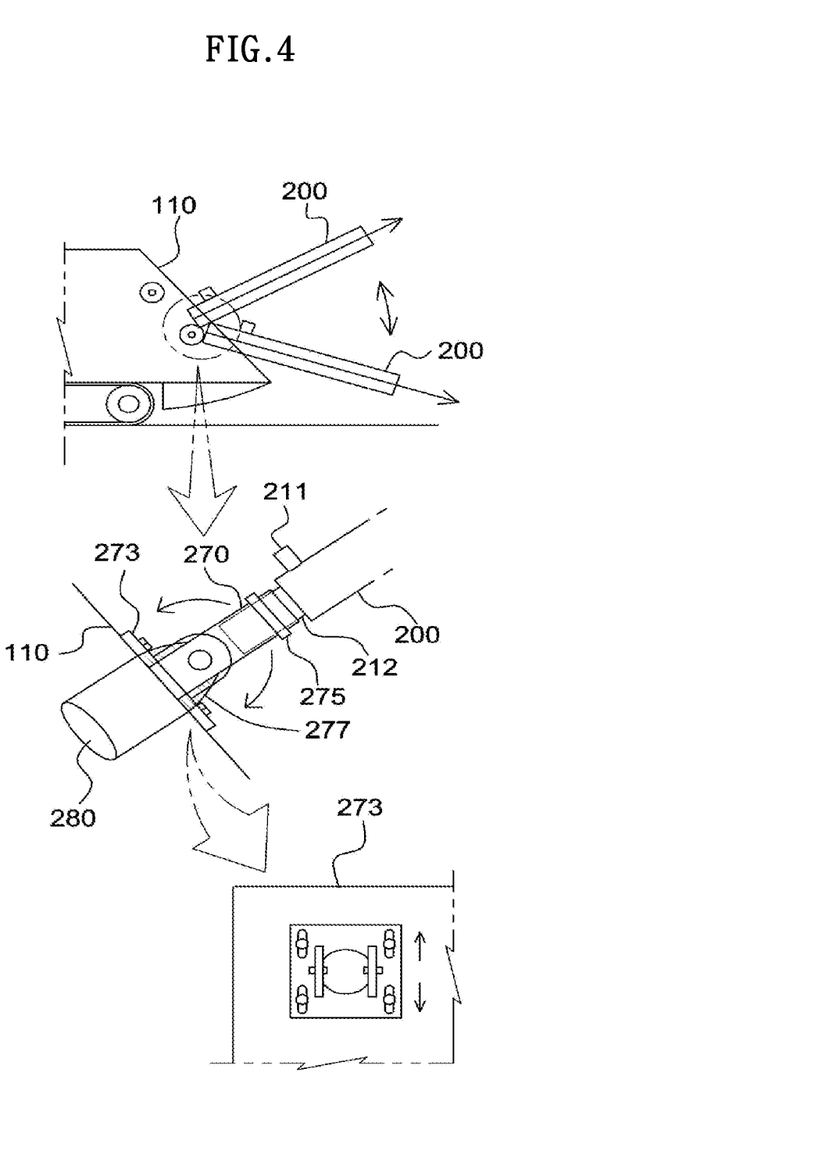
FIG. 4 is a view for explaining a structure for connecting the first dust-collecting pipe unit 200 and the second dust-collecting pipe unit 300 to the wire saw apparatus 100 according to the present invention.

FIG. 4 is a view for explaining a structure for connecting the first dust-collecting pipe unit 200 and the second dust-collecting pipe unit 300 to the wire saw apparatus 100 according to the present invention.

As described above, the first dust-collecting pipe unit 200 is provided so as to surround the wire 10. As shown in FIG. 4, the first dust-collecting pipe unit 200 may pivot upward and downward. The first dust-collecting pipe unit 200 needs to be stably connected to the wire saw apparatus 100 in order to reliably perform a dust-collecting function. To this end, the first dust-collecting pipe unit 200 may be connected to the wire saw apparatus 100 via a connection part 270.

The inlet 212 of the first pipe 210 may be fixedly coupled to one side of the connection part 270 by means of a fixing band. The other side of the connection part 270 may be coupled to a fixing plate 273 and a rubber plate 277 (or a rubber packing), which are mounted on the protective frame 110 of the wire saw apparatus 100. In addition, a cover hole 280 may be formed in a portion of the fixing plate 273 to which the connection part 270 is coupled so as to communicate with the interior of the protective frame 110, and the wire 10 may travel through the cover hole 280. As shown in FIG. 4, the fixing plate 273 mounted on the protective frame 110 may be formed to be moveable upward and downward.

As described above, the dust-collecting pipe units 200 and 300 are provided outside the wire 10 to serve as safety covers. The dust-collecting pipe units 200 and 300 exhibit effects not only of safely protecting workers by preventing separation of the wire 10 during work but also of collecting foreign substances, such as dirt or dust, containing dangerous materials while preventing the foreign substances from being dispersed to the outside or into the atmosphere. In addition, cool air is sprayed to the wire 10 passing through the dust-collecting pipe units 200 and 300 to cool the wire 10, whereby the lifespan of the wire 10 may be prolonged.

Figure 5:
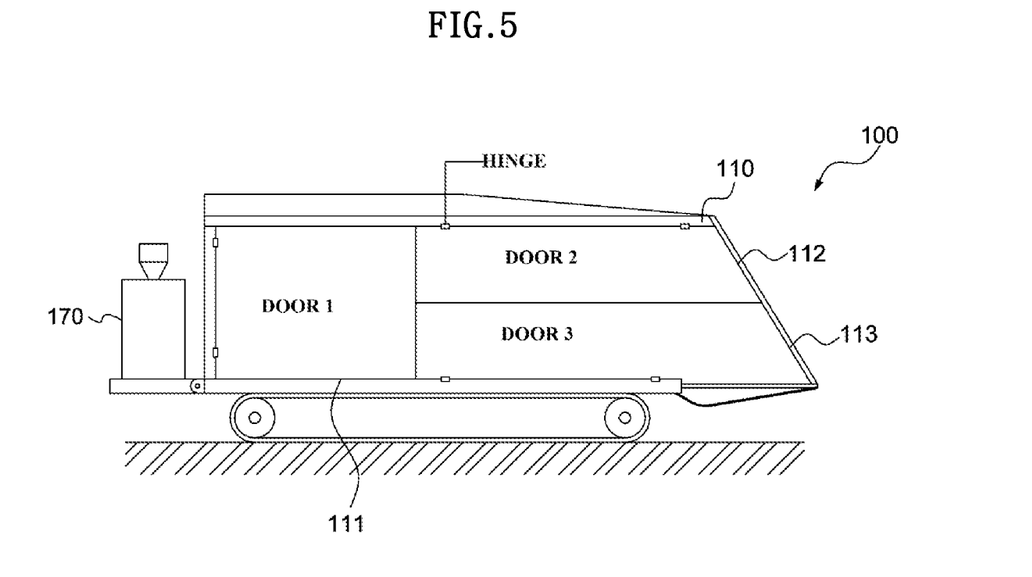
FIG. 5 is a view for explaining collection of dust by a double-sealing cover structure of the wire saw apparatus 100 according to the present invention.

FIG. 5 is a view for explaining collection of dust by a double-sealing cover structure of the wire saw apparatus 100 according to the present invention.

Referring to FIG. 5, the wire saw apparatus 100 may include a plurality of door frames 111, 112, and 113 provided within the protective frame 110. A rectangular frame for a door 1 will be referred to as a first door frame, a rectangular frame for a door 2 will be referred to as a second door frame, and a rectangular frame for a door 3 will be referred to as a third door frame. In one example, the first door frame 111 may be provided on the left side of the wire saw apparatus 100, and the second door frame 112 and the third door frame 113 may be provided on the right-upper side and the right-lower side of the first door frame 111, respectively. The second door frame 112 may be hinged to the protective frame 110 so as to be pivotable upward, and the third door frame 113 may also be hinged to the protective frame 110 so as to be pivotable downward.

In the wire saw apparatus 100 according to the present invention, a configuration including the first main roller 120, the second main roller 125, the first driving roller 127, and the second driving roller 129 may be referred to as a cutting system. In the cutting system, the wire 10 is moved by power. In this case, a sealing cover 117 is mounted between the cutting system and the door frames 111, 112, and 113 in order to prevent foreign substances, such as dust or dirt, separated from the wire 10 from moving out of the protective frame 110, i.e. toward the door frames 111, 112, and 113. Preferably, this sealing cover 117 is made of a transparent material so that a work visually checks the cutting system.

A sealing cover 116 as a transparent window, which is made of a transparent material, is mounted within each of the door frames 111, 112, and 113, thereby preventing foreign substances separated from the wire 10 from moving out of the wire saw apparatus 100, resulting in improvement in dust-collecting effect.

The cutting system including the rollers 120, 125, 127, and 129 is disposed inside the door frames 111, 112, and 113 of the wire saw apparatus 100. The sealing cover 117 made of a transparent material is further mounted between the cutting system and the door frames 111, 112, and 113. In the wire saw apparatus 100, the sealing cover 116 made of a transparent material and provided within each of the door frames 111, 112, and 113 and the sealing cover 117 made of a transparent material and mounted between the door frames 111, 112, and 113 and the cutting system form a double-sealing cover structure. By virtue of this dual-sealing cover structure, foreign substances, such as dust or dirt, containing dangerous materials, which are generated from the wire 10 in the cutting system of the wire saw apparatus 100, are not dispersed into the atmosphere or to the outside of the wire saw apparatus 100, whereby contamination and damage attributable to the dangerous foreign substances may be prevented. As such, since the wire saw apparatus 100 has a transparent dual-sealing cover structure, the wire saw apparatus 100 improves performance, such as dust collection and suction power, and safety.

Figure 6:
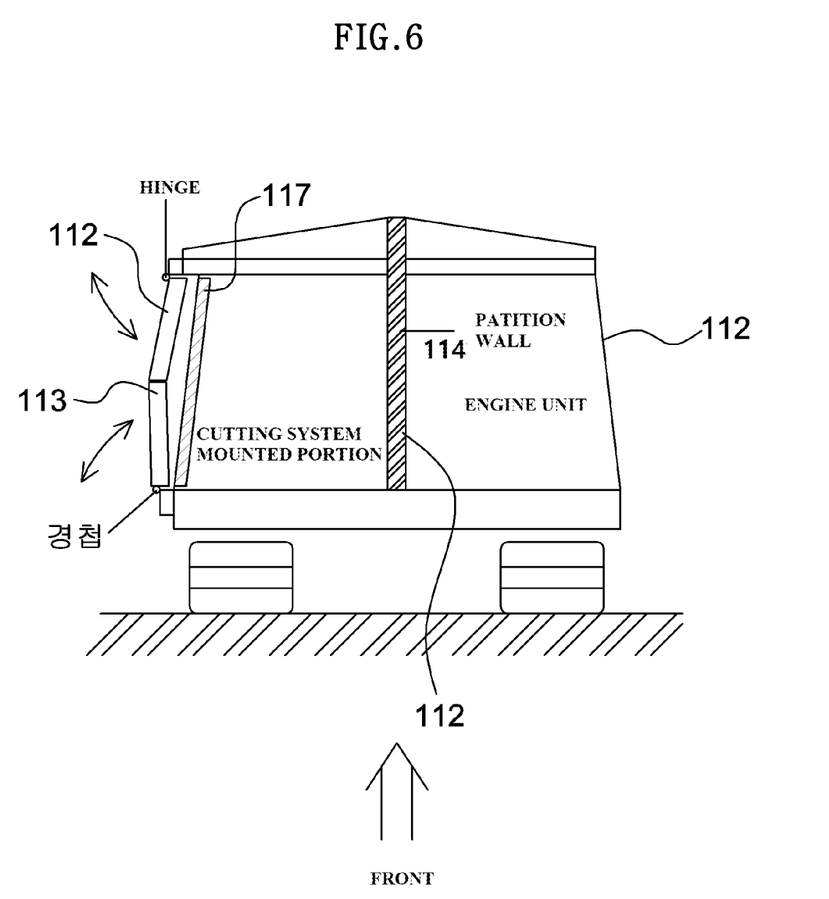
FIG. 6 is a view showing the wire saw apparatus 100 according to the present invention when viewed from the front.

FIG. 6 is a view showing the wire saw apparatus 100 according to the present invention when viewed from the front.

Referring to FIG. 6, the cutting system is mounted in the left portion, and a motor (or an engine unit) is mounted in the right portion. In this case, a partition wall is mounted between the cutting system and the engine unit in order to prevent foreign substances, such as dust or dirt, generated in the cutting system from entering the engine unit. As shown in FIG. 6, the second door frame 112 may be hinged to the upper side of the protective frame 110 so as to be pivotable upward and downward, and the third door frame 113 may also be hinged to the lower side of the protective frame 110.

Figure 7:
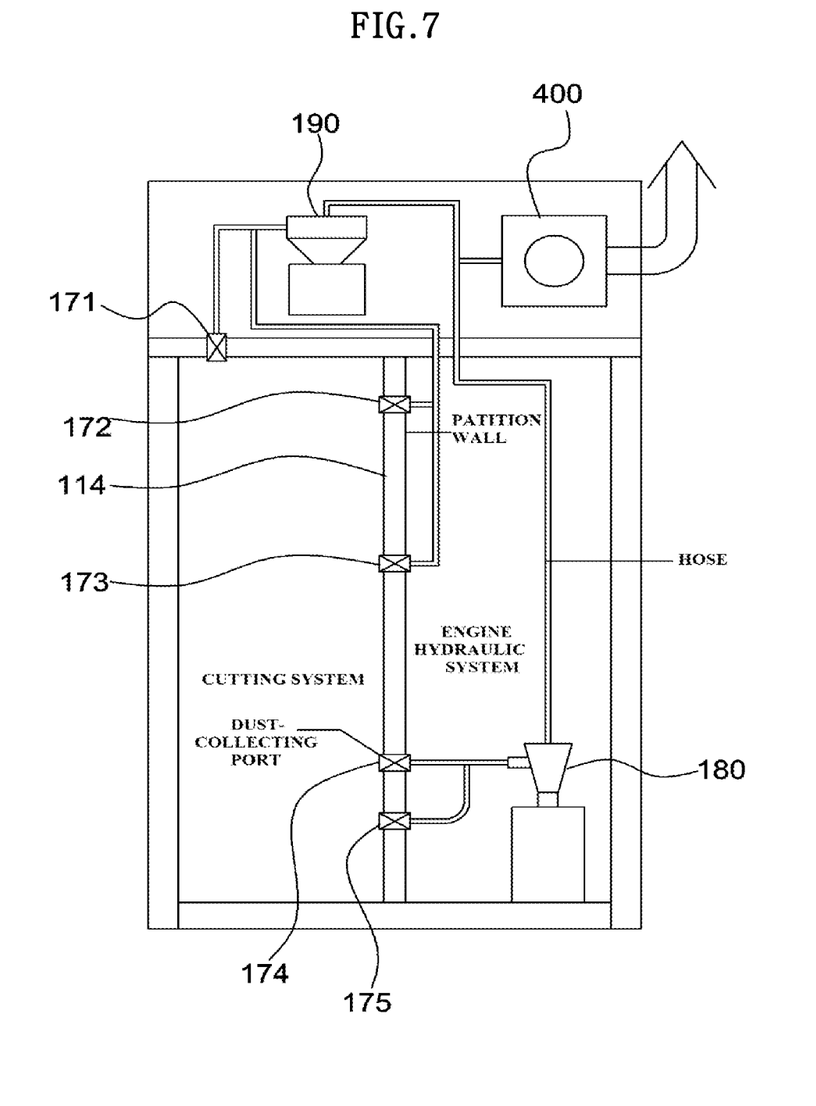
FIG. 7 is a view for explaining a method of collecting dust in the wire saw apparatus 100 according to the present invention.

FIG. 7 is a view for explaining a method of collecting dust in the wire saw apparatus 100 according to the present invention.

In FIG. 7, the left part is a portion in which the cutting system is mounted, and the right part is a portion in which the engine unit is mounted. As described above, the partition wall 114 is mounted between the portion in which the cutting system is mounted and the portion in which the engine unit is mounted. A plurality of dust-collecting ports 172, 173, 174, and 175 is mounted through the partition wall 114. In addition, another partition wall 114 may be disposed between a rear portion of the wire saw apparatus 100 in which the dust collector 190 is mounted, the portion in which the cutting system is mounted, and the portion in which the engine unit is mounted, and a dust-collecting port 171 may be mounted through the other partition wall disposed in the rear portion.

The dust-collecting port 174 may be mounted near the first pulley system 130. In one example, the dust-collecting port 174 may be mounted below the first pulley system 130. The dust-collecting port 175 may be mounted near the second pulley system 140. In one example, the dust-collecting portion 175 may be mounted below the second pulley system 140. The wire saw apparatus 100 includes a motor (e.g. a motor for industrial cleaning) configured to supply power enabling the dust collectors 180 and 190 to collect dust. Foreign substances, such as dust or dirt, are collected in a manner of suctioning air through the motor.

Connection pipes, such as hoses, are connected to the first dust collector 180 and the dust-collecting ports 174 and 175. The first dust collector 180 may receive power from the motor for cleaning provided in the wire saw apparatus 100 and may collect foreign substances, such as dust or dirt, in a manner of suctioning air from the dust-collecting ports 174 and 175 through the connection pipes, such as hoses. The foreign substances collected from the dust-collecting ports 174 and 175 may be stored in the first dust collector 180. Foreign substances, such as dirt, falling toward the ground from the wire 10 passing through the first pulley system 130 and the second pulley system 140 may also be collected in the first dust collector 180 through the dust-collecting port 174 and the dust-collecting port 175.

Connection pipes, such as hoses, are connected to the second dust collector 190 and the dust-collecting ports 172 and 173. The dust-collecting port 172 may be mounted near the first main roller 120, and the dust-collecting port 173 may be mounted near the first driving roller 127. The dust-collecting ports 172 and 173 are mounted through the partition wall 114 shown in FIG. 7. Similarly, the second dust collector 190 receives power from the motor for cleaning provided in the wire saw apparatus 100 and collects foreign substances, such as dust or dirt, in a manner of suctioning air from the dust-collecting ports 172 and 173 through the connection pipes, such as hoses. The foreign substances, such as dust or dirt, collected from the dust-collecting ports 172 and 173 are stored in the second dust collector 190. The first dust collector 180 and the second dust collector 190 are cyclone dust collectors that separate dust particles from air using a difference between centrifugal force and inertial force acting on the dust particles to collect the same.

In this way, foreign substances, such as dust or dirt, are collected near the first main roller 120, the second main roller 125, the first pulley system 130, and the second pulley system 140, which are provided in the cutting system, whereby foreign substances, such as concrete dust or dirt, exposed to radiation may be prevented from being dispersed into the atmosphere or discharged to the outside of the wire saw apparatus 100. Since the first dust collector 180 and the second dust collector 190 suction and collect/filter foreign substances, such as dust or dirt in the air, the first dust collector 180 and the second dust collector 190 may be regarded as primary dust-collecting devices. In this case, a secondary dust-collecting device 400 may be used to purify air, rather than discharging air into the atmosphere after collection of dust by the first dust collector 180 and the second dust collector 190, whereby purified air may be discharged into the atmosphere, and as a result, generation of fine dust and environmental pollution may be prevented. To this end, the first dust collector 180, the second dust collector 190, and the secondary dust-collecting device 400 may be connected to each other via connection pipes, such as hoses. The secondary dust-collecting device 400 receives power from the motor for cleaning provided in the wire saw apparatus 100, suctions air from the first dust collector 180 and the second dust collector 190, performs filtering to purify the air, and discharges the purified air into the atmosphere.

Figure 8:
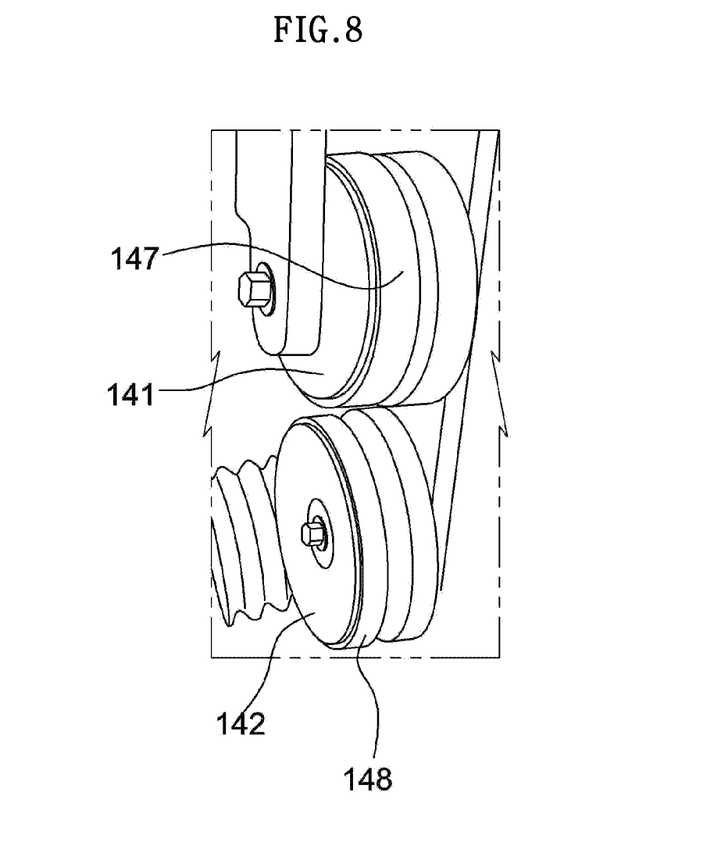
FIG. 8 is a view for explaining rollers 120, 125, 127, 129, 131, 132, 144, and 142 provided in the wire saw apparatus 100.

FIG. 8 is a view for explaining the rollers 120, 125, 127, 129, 131, 132, 144, and 142 provided in the wire saw apparatus 100.

FIG. 8 shows the second upper roller 144 and the second lower roller 142 of the second pulley system 140 among the rollers 120, 125, 127, 129, 131, 132, 144, and 142. Rubber members 147 and 148 containing special materials are attached to the outer circumferential surfaces of the second upper roller 144 and the second lower roller 142, respectively. In general, urethane members are attached to the outer circumferential surfaces of the rollers. However, urethane is vulnerable to heat and thus has poor durability. The present invention proposes rubber members 147 and 148 containing special materials instead of urethane members. In one example, the rubber members 147 and 148 containing special materials include stone powder and a silicon (Si) component, and thus has excellent robustness, for example, is highly resistant to adhesion heat generated from the wire 10.

Although the rubber members 147 and 148 containing special materials have been described as being attached to the outer circumferential surfaces of the second upper roller 144 and the second lower roller 142, respectively, for convenience of description, the rubber members containing special materials are attached to all of the rollers 120, 125, 127, 129, 131, 132, 144, and 142 provided in the wire saw apparatus 100.

As described above, the wire saw apparatus 100 according to the present invention is very advantageous in dismantling dangerous structures, such as nuclear power plants or nuclear structures. Because a wet cutting method is not suitable for dangerous structures, a dry cutting method is used.

The wire saw apparatus 100 prevents foreign substances containing dangerous materials separated from the wire 10 traveling therethrough from being dispersed into the atmosphere or to the outside using the dust-collecting pipe units 200 and 300, thereby greatly improving safety during dismantling work. In addition, the wire saw apparatus 100 prevents separation of the wire 10 using the dust-collecting pipe units 200 and 300, thereby ensuring worker safety. In addition, the wire saw apparatus 100 cools the wire 10 heated during cutting work using cool air supplied thereto through the dust-collecting pipe units 200 and 300, thereby prolonging the lifespan of the wire 10.

The wire saw apparatus 100 according to the present invention prevents foreign substances containing dangerous materials from being dispersed into the atmosphere or to the outside of the wire saw apparatus 100 using the double-sealing cover structure mounted therein. In addition, the wire saw apparatus 100 according to the present invention may efficiently collect foreign substances, such as dust or dirt, containing dangerous materials using the plurality of dust-collecting ports and the dust collector mounted in the wire saw apparatus 100.

In the wire saw apparatus 100 according to the present invention, since the rubber members containing special materials are attached to the outer circumferential surfaces of the rollers instead of conventional urethane members, the rollers may be highly resistant to heat generated from the wire 10 and thus may have improved durability, and consequently, efficiency of cutting work may be improved.

The above-described embodiments correspond to combinations of elements and features of the present invention in prescribed forms. The respective elements or features may be considered as selective unless they are explicitly mentioned. Each of the elements or features may be implemented in such a way as not to be combined with other elements or features. Moreover, it is possible to implement an embodiment of the present invention by combining elements and/or features together in part. A sequence of operations explained for each embodiment of the present invention may be modified. Some configurations or features of one embodiment may be included in another embodiment, or may be substituted with corresponding configurations or features of another embodiment. In addition, it will be apparent that an embodiment may be configured by combining claims failing to have relation of explicit citation in the appended claims together or may be included in new claims through amendment after filing an application.

It will be apparent to those skilled in the art that various changes in form and details may be made without departing from the essential characteristics of the invention set forth herein. Accordingly, the above detailed description is not intended to be construed to limit the invention in all aspects and to be considered by way of example. The scope of the invention should be determined by reasonable interpretation of the appended claims and all equivalent modifications made without departing from the invention should be included in the following claims.

DESCRIPTION OF REFERENCE NUMERALS

10: cutting wire, 100: wire saw apparatus using dry cutting method, 110: protective frame, 111: first door frame, 112: second door frame, 113: third door frame, 114: partition wall, 115: bottom inclined surface, 120: first main roller, 125: second main roller, 127: first driving roller, 129: second driving roller, 130: first pulley system, 131: first upper roller, 132: first lower roller, 140: second pulley system, 144: second upper roller, 142: second lower roller, 170: dust collector, 171 to 175: dust-collecting port, 180: first dust collector, 190: second dust collector, 200: first dust-collecting pipe unit, 300: second dust-collecting pipe unit, 210: first pipe, 211: first air injection port, 212: inlet, 213: rubber packing, 214: first coupling portion, 250: second pipe, 251: second air injection port, 252: inlet, 253: rubber packing, 254: second coupling portion, 270: connection part, 273: fixing plate, 275: fixing coupling part, 277: rubber plate, 280: cover hole, 300: second dust-collecting pipe unit, 400: secondary dust-collecting device (air purifier), 500: structure, 600: dust-collecting device

INDUSTRIAL APPLICABILITY

The wire saw apparatus according to the present invention configured to collect foreign substances generated during cutting work using a dry cutting method is industrially applicable to industrial construction and dismantling sites.

The invention claimed is:

1. A wire saw apparatus configured to collect foreign substances generated during a dry cutting process, the wire saw apparatus comprising:
   a first pulley system configured to feed a wire to a structure to be cut;
   a second pulley system configured to receive the wire from the structure;
   a first dust-collecting pipe unit configured to surround the wire between a point of the wire that is separated from the structure after surrounding the structure and a point of the wire that enters the first pulley system; and a second dust-collecting pipe unit configured to surround the wire between a point of the wire that reaches the structure to surround the structure and a point of the wire that escapes from the second pulley system, wherein at least one of the first dust-collecting pipe unit or the second dust-collecting pipe unit comprises a first pipe and a second pipe having different diameters from each other, and the first pipe and the second pipe are connected to each other so as to be movable in a horizontal direction in a state in which at least a portion of the first pipe is inserted into the second pipe.

2. The wire saw apparatus according to claim 1, wherein each of the first pipe and the second pipe comprises an inlet formed in one side thereof to allow the wire to pass therethrough, and wherein each of the first pipe and the second pipe comprises an injection port formed in an outer circumferential surface thereof to allow air to be injected thereinto.

3. The wire saw apparatus according to claim 2, wherein each of the first pipe and the second pipe has a coupling structure dividable into an upper part and a lower part, and wherein each of the first pipe and the second pipe comprises a rubber packing inserted into the inlet formed therein.

4. The wire saw apparatus according to claim 3, wherein the rubber packing is formed to be dividable into an upper part and a lower part, and the upper part and the lower part form a diameter larger than a diameter of the wire when coupled to each other.

5. The wire saw apparatus according to claim 1, further comprising:

dust-collecting ports mounted near the first pulley system and the second pulley system;

a first dust collector configured to collect foreign substances in a manner of suctioning air through a connection pipe connected to each of the dust-collecting ports; and a motor for cleaning connected to the first dust collector via the connection pipe to supply suction force enabling the first dust collector to suction the air.

6. The wire saw apparatus according to claim 5, further comprising:

at least one main roller configured to rotate to feed the wire;

at least one driving roller disposed below the at least one main roller to feed the wire to the second pulley system;

dust-collecting ports mounted near the at least one main roller and the at least one driving roller; and a second dust collector configured to collect foreign substances in a manner of suctioning air through a connection pipe connected to each of the dust-collecting ports, wherein the motor for cleaning is connected to the second dust collector via the connection pipe to supply air suction force to the second dust collector.

7. The wire saw apparatus according to claim 1, wherein at least one of the first pulley system or the second pulley system comprises a rubber member containing stone powder and a silicon component and attached to an outer circumferential surface of a roller provided therein.

8. The wire saw apparatus according to claim 1, further comprising:

a protective frame configured to protect an interior of the wire saw apparatus;

a first transparent sealing cover mounted between the protective frame and a cutting system comprising the first and second pulley systems; and a second transparent sealing cover mounted to each of door frames provided in the protective frame.

9. The wire saw apparatus according to claim 3, wherein the upper part and the lower part of the first pipe are coupled to each other using a flat head bolt, and wherein the upper part and the lower part of the second pipe are coupled to each other using a bolt and a nut.

10. The wire saw apparatus according to claim 1, wherein each of the first dust-collecting pipe unit and the second dust-collecting pipe unit is connected to the protective frame via a connection part, wherein the first pipe is coupled at an inlet thereof to the connection part using a fixing band, and wherein the connection part and a fixing plate mounted on the protective frame are packed and coupled to each other using a rubber plate.

11. A wire saw apparatus configured to collect foreign substances generated during a dry cutting process, the wire saw apparatus comprising:

a first pulley system configured to pass a wire introduced thereinto from one end of a cover provided so as to seal a cut portion of a structure to be cut;

at least one main roller configured to allow the wire that has passed through the first pulley system to rotate along an outer circumferential surface thereof using power; and at least one driving roller configured to feed the wire introduced thereinto from the at least one main roller to a second pulley system, wherein the second pulley system passes the wire introduced thereinto from the at least one driving roller to feed the wire to an opposite end of the cover, and wherein a member containing stone powder and a silicon component is attached to an outer circumferential surface of at least one roller among the at least one main roller, the at least one driving roller, at least one roller provided in the first pulley system, and at least one roller provided in the second pulley system.

12. The wire saw apparatus according to claim 11, wherein the member containing stone powder and a silicon component is a rubber member.

13. The wire saw apparatus according to claim 11, comprising:

a first dust-collecting pipe unit configured to surround the wire between the one end of the cover and a point of the wire that enters the first pulley system; and a second dust-collecting pipe unit configured to surround the wire between the opposite end of the cover and a point of the wire that escapes from the second pulley system, wherein at least one of the first dust-collecting pipe unit or the second dust-collecting pipe unit comprises a first pipe and a second pipe having different diameters from each other, and the first pipe and the second pipe are connected to each other so as to be movable in a horizontal direction in a state in which at least a portion of the first pipe is inserted into the second pipe.

14. The wire saw apparatus according to claim 11, wherein each of the first pipe and the second pipe comprises an inlet formed in one side thereof to allow the wire to pass therethrough, and wherein each of the first pipe and the second pipe comprises an injection port formed in an outer circumferential surface thereof to allow air to be injected thereinto.

15. The wire saw apparatus according to claim 11, wherein the foreign substances comprise a radioactive material, and
wherein the structure comprises a nuclear structure.

* * * * *